(12) United States Patent
Williams (10) Patent No.: US 7,597,356 B2
(45) Date of Patent: Oct. 6, 2009

(54) AIRBAG CUSHIONS WITH GAS DEFLECTORS AND OPTIONAL VENTING FOR OUT-OF-POSITION CONDITIONS

(75) Inventor: Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 69 days.

(21) Appl. No.: 11/758,419

(22) Filed: Jun. 5, 2007

(65) Prior Publication Data

US 2008/0303256 A1 Dec. 11, 2008

(51) Int. Cl.
B60R 21/239 (2006.01)
B60R 21/26 (2006.01)

(52) U.S. Cl. .................. 280/739; 280/736; 280/742; 280/743.2

(58) Field of Classification Search .......... 280/736, 280/739, 740, 742, 743.1, 743.2
See application file for complete search history.

(56) References Cited

U.S. PATENT DOCUMENTS

| | | | |
|---|---|---|---|
| 5,016,913 A | 5/1991 | Nakajima et al. |
| 5,172,933 A | 12/1992 | Strasser |
| 5,246,250 A | 9/1993 | Wolanin et al. |
| 5,280,953 A | 1/1994 | Wolanin et al. |
| 5,290,953 A | 3/1994 | Clark, Jr. et al. |
| 5,306,043 A | 4/1994 | Mihm et al. |
| 5,350,188 A | 9/1994 | Sato |
| 5,405,166 A | 4/1995 | Rogerson |
| 5,421,607 A | 6/1995 | Gordon |
| 5,492,363 A | 2/1996 | Hartmeyer et al. |
| 5,494,314 A | 2/1996 | Kriska et al. |
| 5,603,526 A | 2/1997 | Buchanan |
| 5,931,497 A | 8/1999 | Fischer |
| 6,056,318 A | 5/2000 | Braunschadel |
| 6,095,557 A | 8/2000 | Takimoto et al. |
| 6,126,196 A | 10/2000 | Zimmerman |
| 6,139,048 A | 10/2000 | Braunschadel |
| 6,183,003 B1 | 2/2001 | Matsuhashi et al. |
| 6,206,408 B1 | 3/2001 | Schneider |
| 6,247,726 B1 | 6/2001 | Ryan |
| 6,290,257 B1 | 9/2001 | Bunce et al. |
| 6,371,509 B1 | 4/2002 | Ellerbrok et al. |
| 6,398,258 B2 | 6/2002 | Hamada et al. |
| 6,631,921 B1 | 10/2003 | Drossler et al. |
| 6,631,922 B2 | 10/2003 | Hess et al. |
| 6,648,371 B2 | 11/2003 | Vendely et al. |
| 6,746,045 B2 | 6/2004 | Short et al. |
| 6,773,027 B2 | 8/2004 | Bohn et al. |
| 6,773,030 B2 | 8/2004 | Fischer |

(Continued)

FOREIGN PATENT DOCUMENTS

DE 196 40 322 3/1996

(Continued)

Primary Examiner—Ruth Ilan
Assistant Examiner—Keith Frisby
(74) Attorney, Agent, or Firm—Sally J. Brown; Stoel Rivers LLP (57) ABSTRACT

An airbag cushion is disclosed for use in automotive protective systems. The airbag cushion includes at least one gas deflector which directs gas to a closeable vent to allow gas to be vented out of the cushion when an obstruction is encountered.

32 Claims, 10 Drawing Sheets

U.S. PATENT DOCUMENTS

| | | |
|---|---|---|
| 6,832,778 B2 | 12/2004 | Pinsenschaum et al. |
| 6,863,304 B2 | 3/2005 | Reiter et al. |
| 6,918,613 B2 | 7/2005 | Short et al. |
| 6,932,385 B2 | 8/2005 | Hawthorn et al. |
| 6,971,671 B2 | 12/2005 | Schneider et al. |
| 7,059,634 B2 | 6/2006 | Bossecker et al. |
| 7,083,191 B2 | 8/2006 | Fischer |
| 7,083,192 B2 | 8/2006 | Fischer et al. |
| 7,210,702 B2 * | 5/2007 | Soderquist .................. 280/740 |
| 7,237,802 B2 | 7/2007 | Rose et al. |
| 7,261,319 B2 | 8/2007 | DePottey et al. |
| 7,328,915 B2 | 2/2008 | Smith et al. |
| 7,347,450 B2 | 3/2008 | Williams et al. |
| 7,360,789 B2 | 4/2008 | Bito |
| 7,364,192 B2 | 4/2008 | Braun et al. |
| 2003/0020266 A1 | 1/2003 | Vendely et al. |
| 2003/0020268 A1 | 1/2003 | Reiter et al. |
| 2003/0057691 A1 | 3/2003 | Tokita et al. |
| 2003/0127839 A1 | 7/2003 | Jenkins |
| 2003/0209895 A1 | 11/2003 | Gu |
| 2003/0214125 A1 | 11/2003 | Schneider et al. |
| 2004/0012179 A1 * | 1/2004 | Pinsenschaum et al. ..... 280/739 |
| 2004/0056459 A1 | 3/2004 | Kassman et al. |
| 2004/0090054 A1 | 5/2004 | Bossecker et al. |
| 2004/0130135 A1 | 7/2004 | Ekdahl |
| 2004/0188990 A1 | 9/2004 | Short et al. |
| 2004/0256842 A1 | 12/2004 | Breed et al. |
| 2005/0052008 A1 | 3/2005 | Rose et al. |
| 2005/0098990 A1 | 5/2005 | Pinsenschaum et al. |
| 2005/0236822 A1 | 10/2005 | Rose et al. |
| 2005/0248137 A1 | 11/2005 | Delventhal et al. |
| 2006/0071461 A1 * | 4/2006 | Williams et al. ............ 280/739 |
| 2006/0071462 A1 | 4/2006 | Smith et al. |
| 2006/0151979 A1 | 7/2006 | DePottey et al. |
| 2006/0197327 A1 | 9/2006 | Maripudi et al. |
| 2006/0202454 A1 | 9/2006 | Parizal et al. |
| 2007/0052222 A1 * | 3/2007 | Higuchi et al. .............. 280/738 |
| 2007/0108750 A1 * | 5/2007 | Bauer et al. .................. 280/740 |
| 2007/0126218 A1 | 6/2007 | Schnieder et al. |
| 2007/0126219 A1 | 6/2007 | Williams |
| 2007/0132222 A1 | 6/2007 | Thomas et al. |
| 2007/0205590 A1 | 9/2007 | Klinkenberger et al. |
| 2008/0007038 A1 | 1/2008 | Fischer et al. |
| 2008/0018086 A1 | 1/2008 | Ford et al. |
| 2008/0023950 A1 * | 1/2008 | Kalczynski et al. ......... 280/739 |
| 2008/0073890 A1 | 3/2008 | Williams et al. |
| 2008/0073891 A1 | 3/2008 | Rose et al. |
| 2008/0073892 A1 | 3/2008 | Rose et al. |
| 2008/0073893 A1 | 3/2008 | Schneider |
| 2008/0079250 A1 | 4/2008 | Boyle et al. |
| 2009/0039630 A1 | 2/2009 | Schneider et al. |

FOREIGN PATENT DOCUMENTS

| | | |
|---|---|---|
| JP | 05085295 | 4/1993 |
| JP | 2001-158315 | 6/2001 |

* cited by examiner

AIRBAG CUSHIONS WITH GAS DEFLECTORS AND OPTIONAL VENTING FOR OUT-OF-POSITION CONDITIONS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

INDEX OF ELEMENTS IDENTIFIED IN THE DRAWINGS

30 occupant
40 instrument panel
100 airbag module
101 airbag cushion
102 interior of the airbag cushion 101
102*f* front portion of interior 102
108 throat
110 membrane
111 interior surface of airbag cushion membrane
112 exterior surface of the airbag cushion membrane
113 face surface
116 seam
120 airbag module housing
130 gas deflector
131 material
132 opening
133 perimeter of direct opening 134
134 direct opening of gas deflector
135 side openings
136 perimeter of side openings 135
137 arms
138 seams
150 cinch vent, laced vent or other closeable vent
151 rim or diameter of cinch tube and sides edges of laced vent
152 tube of cinch vent and sides of laced vent
153 tether holder of vent such as a sleeve
154 holes in tether holder of cinch vent and holes of laced vent
156 ends of laced vent
158 vent apertures
160 fixed vent
170 control tether
171 stitching or retention knot
173 vent portion
179 tether attachment
200 airbag module
201 airbag cushion
202 interior of the airbag cushion 201
202*f* front portion of interior 202
210 airbag cushion membrane
211 interior surface of airbag cushion membrane
212 exterior surface of the airbag cushion membrane
213 face surface
220 airbag module housing
230 gas deflector
234 forward opening of gas deflector
235 openings
236 perimeter of openings 235
237 arms
238 seams
250 closeable flap vent
251 rim or diameter of edges of vent aperture
258 vent aperture
270 control tether
275 vent portion
279 tether attachment 280 tether holder
300 airbag module
301 airbag cushion
302 interior of the airbag cushion 301
302f front portion of interior 302
310 airbag cushion membrane
311 interior surface of airbag cushion membrane
312 exterior surface of the airbag cushion membrane
313 face surface
320 airbag module housing
330 gas deflector
334 forward opening of gas deflector
335 openings
336 perimeter of openings 335
337 arms
338 seams
350 closeable flap vent
351 rim or diameter of edges of vent aperture
358 vent aperture
370 control tether
375 vent portion
376 apertures
378 tack stitching
379 tether attachment

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, an airbag cushion inflates and deploys through a cosmetic cover. The airbag cushion deploys towards the occupant and provides a restraint.

Full inflation of an airbag is not always desired. For example, partial inflation offers optimal protection when the occupant being protected by the airbag cushion is a child, a baby in a rear facing car seat or an adult positioned too close to the airbag cushion. Such conditions are referred to as out-of-position conditions. Embodiments described below provide an airbag cushion that responds to an occupant's position and vents accordingly to avoid excessive deploying impact.

Embodiments disclosed herein permit response to occupant position and vents accordingly. Each embodiment has a closeable opening for venting gas referred to as an optionally closeable vent for out-of-position (OOP) conditions such as a cinch vent. Each embodiment also has a gas deflector or diffuser positioned in the cushion to optimize the flow of gas out of the closeable vents. The gas deflector enables the rapid escape of the gas out of the cushion via the closeable vents.

The gas deflector is positioned in the interior of the inflatable airbag cushion to direct inflation gas from an inflator and to optimize the flow of gas out of the closeable vents. The gas deflector has at least one arm configured to direct gas to a closeable vent to enable the rapid escape of the gas out of the cushion via the closeable vent. The arm has at least one opening to permit gas to be re-directed to the interior of the inflatable airbag cushion when the closeable vent is closed. The arm of the gas deflector and the closeable vent are configured to move together during expansion of the inflatable airbag cushion.

Some embodiments of the closeable vent may be closed via a component such as a control tether or cord. The tether may be connected at one end to a vent and at an opposing end elsewhere within or on the cushion. If an occupant is in close proximity to the deploying airbag and restricts normal inflation, the closeable vent remains open and allows gas to rapidly escape. If the occupant is in a normal position and inflation is unrestricted, the tension pulls on the tether to quickly close the closeable vent. Closure retains gas for normal occupant restraint. Thus, the closeable vent may be used as a variable feature in out-of-position conditions and in normal restraint conditions. In this manner, the airbag cushion is sensitive to obstructive expansion of the cushion. The control tethers may be optionally configured to incrementally close the vent. For example, the tether may have tabs or teeth which pass through a feature but can not pass back through the feature so that the tether incrementally cinches the vent closed in a deployment direction while restricting movement in the opposite direction such as during ride-down.

Figure 1A:
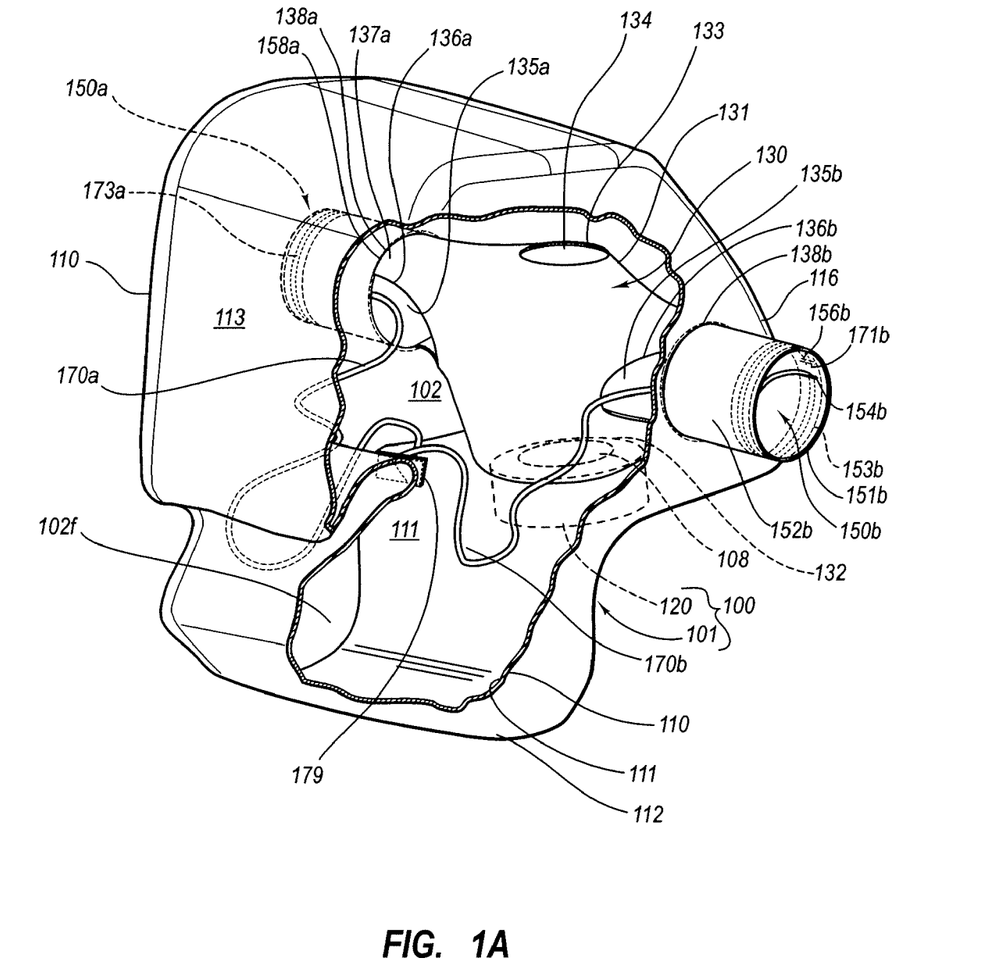
FIG. 1A is a perspective view of a partially expanded airbag cushion with a partial cut-away to show the gas deflector, tethers, and the closeable vents (cinch vents).
Figure 1B:
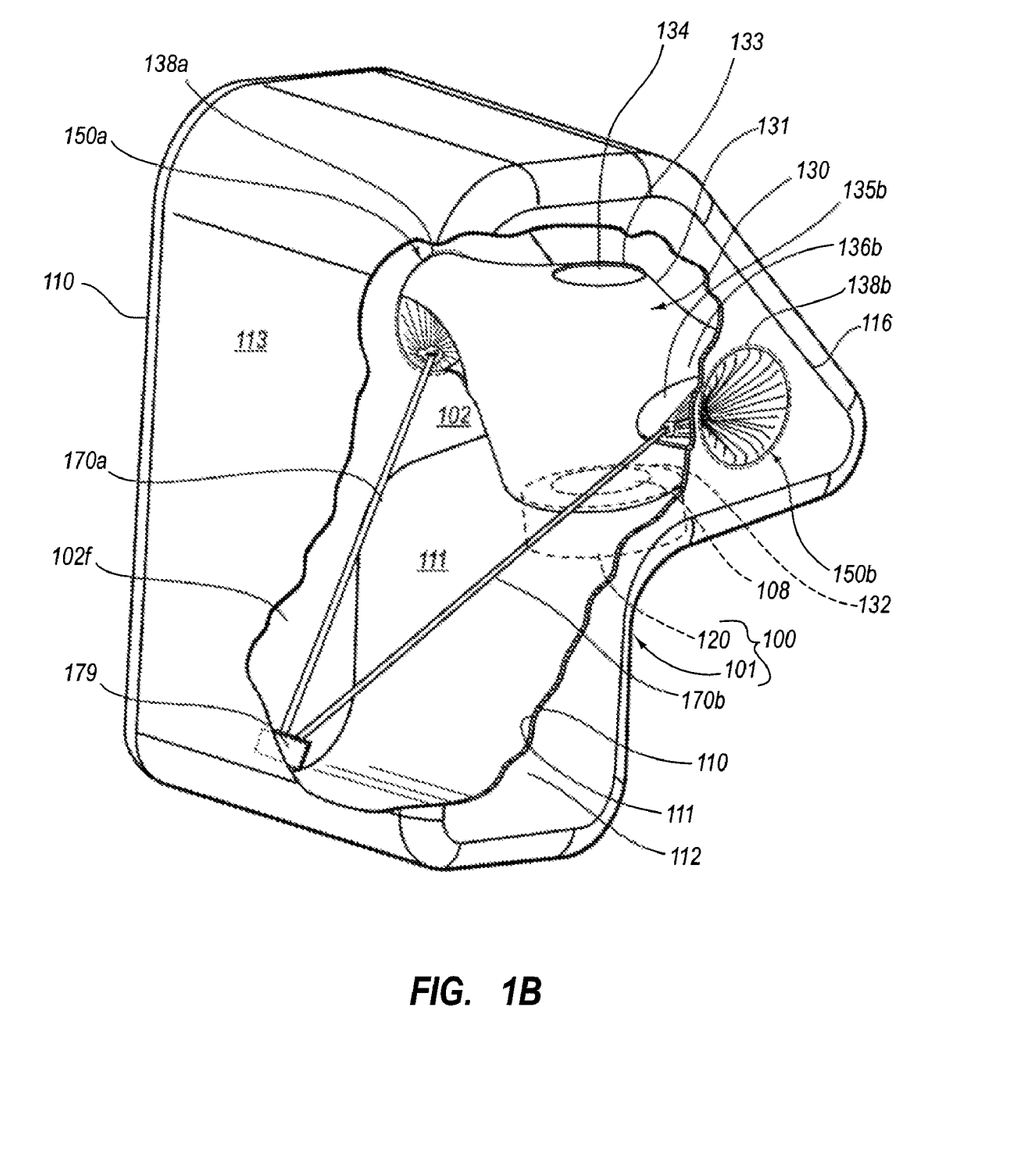
FIG. 1B is a perspective view of the airbag cushion, as shown in FIG. 1A, after it has been fully expanded once the vents have been closed and the gas deflector has re-directed gas to the interior of the airbag.

With reference now to the accompanying figures, particular embodiments of the invention will now be described in greater detail. One embodiment of airbag module 100 is shown in FIGS. 1A-1B comprising an airbag cushion 101 and a housing 120. FIG. 1A is a perspective view which shows housing 120 of airbag module 100 having an inflator (not shown) delivering gas into airbag cushion 101 via a gas deflector 130 within airbag cushion 101 of airbag module 100. In FIG. 1A, the initially deploying airbag cushion 101 has a control tether 170 which is slack and the closeable cinch vent 150 remains open. If an occupant is not out-of-position, tether 170 is pulled taut and the closeable vent 150 begins to close. FIG. 1B shows closeable vents 150a-b after they have been closed as control tethers 170a-b have been pulled taut by expansion of the cushion due to the pressure of the gas in airbag cushion 101.

Some of the structures of the airbag cushion 101 are best seen with reference to FIGS. 1A-1B while FIGS. 2A-2C, FIGS. 3A-3C, and FIG. 4 show only some components such as gas deflector 130, closeable vents 150, fixed vents 160 and tethers 170. Airbag cushion 101 has an interior 102 with front portion 102f. Airbag cushion 101 also has a membrane 110 with an interior surface 111 and exterior surface 112. Vent apertures 158 in membrane 110 provides an opening for gas to exit interior 102 of airbag cushion 101 via closeable vents 150. Gas enters interior 102 via another opening in the membrane 110, throat 108.

Gas deflector 130 is configured to create a pressure pocket and re-direct the inflation gas. The embodiment of the gas deflector shown in FIG. 1A at 130 comprises a material 131 which may be integral with a surface of cushion 101 or attached to cushion 101. For example, gas deflector 130 may be sewn together with the cushion. Gas deflector 130 receives gas via throat 108 through opening 132. Perimeter 133 defines direct opening 134. Direct opening 134 assists with normal inflation of cushion 101 to assist in getting cushion 101 in position in time for dynamic loading purposes.

In addition to direct opening 134, gas is also directed out of side openings 135a-135b. Openings 135a-b are respectively defined by perimeters or rims 136a-b at the ends of each arm 137a-b. In the embodiment shown in FIGS. 1A-1B, a portion of each rim 136a-b is attached to the cushion membrane 110 so only a portion of the gas is directed out of the airbag cushion 101 via vents 150a-b while another portion of the gas is directed from gas deflector 130 into the interior 102 of airbag cushion 101. Because each arm 137a-b is attached to the cushion membrane, each arm 137a-b is configured to move respectively with vents 150a-b during expansion of the inflatable airbag cushion. Movement together of each arm 137a-b of gas deflector 130 and the respective closeable vents 150a-b during expansion of the airbag cushion 101 enables gas exiting the arm to be continuously directed to the respective closeable vent. In addition to permitting gas to be redirected into the interior 102 of airbag cushion 101 when the closeable vent 150a-b is closed, each opening 135a-b of each arm 137a-b also permits tether 170 to extend from closeable vent 150a-b to cushion membrane 110.

Cushion 101 is depicted with each arm attached to cushion membrane at a seam. The seams are identified as vent aligners 138a-b. Of course, each arm can also be attached to the vent tube. In other embodiments, a seam between gas deflector 130 and membrane 110 may not be necessary as the vent tube is an integral extension of the gas deflector.

Figure 5:
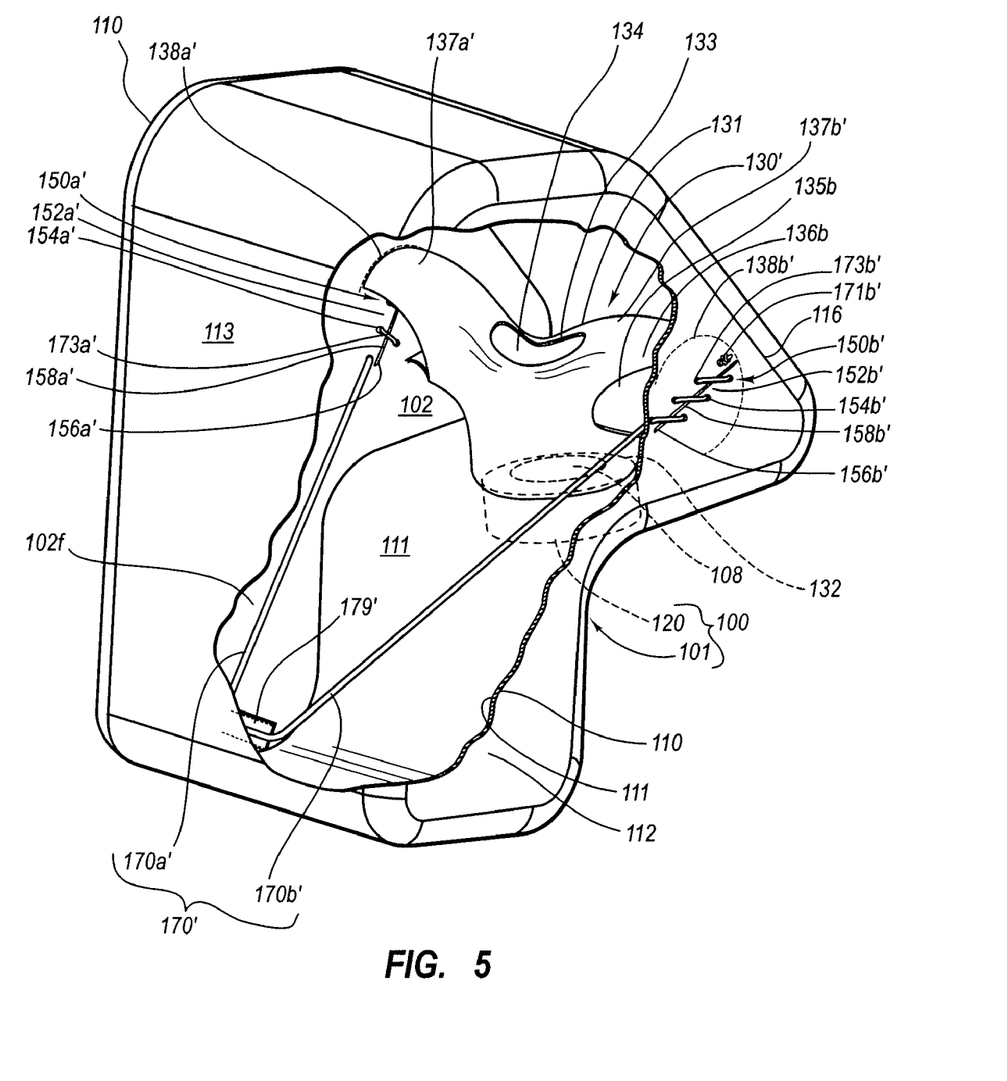
FIG. 5 is a perspective view of another embodiment of a deployed airbag cushion.
Figure 6:
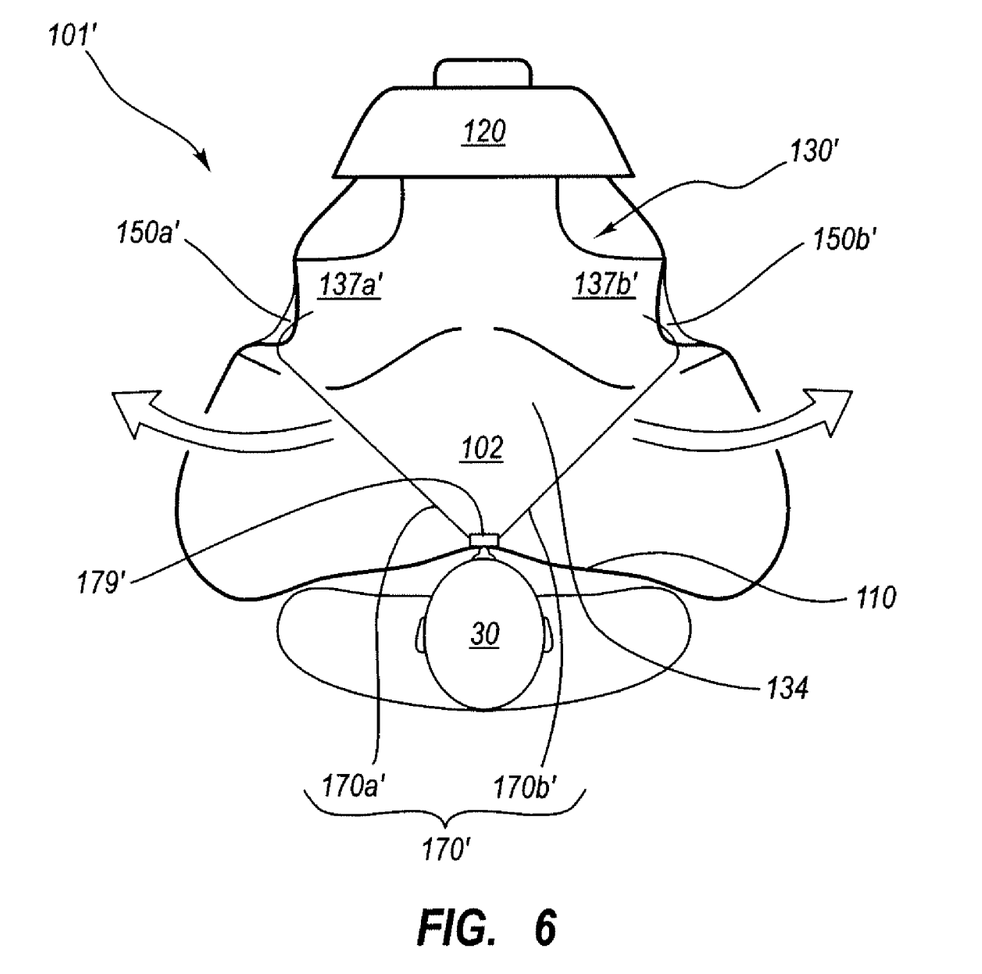
FIG. 6 is a cross-sectional view of the embodiment of the airbag cushion shown in FIG. 5.

While gas deflector 130 is T-shaped because arms 137a-b are directly opposite each other, other configurations may also be utilized. For example, the gas deflector may be rectangular, trapezoidal, hexagonal, round, etc. It may also have a portion which is round or elliptical while other portions are angled. As described below, FIGS. 5-6 depict a gas deflector which is Y-shaped.

Not only are side openings 135a-b strategically located to redirect the gas flow generally toward closeable vents 150a-b and out of cushion 101 but side openings 135a-b, are also sized for optimal gas flow. Side openings 135a-b are large enough to allow most of the gas to flow through them. Only in out-of-position conditions does the focused gas flow from gas deflector 130 to the aligned closeable vents 150a-b to allow a more rapid escape of the inflation gas as shown in FIG. 1A.

As previously indicated, gas deflector 130 and closeable vents 150a-b are not independent of each other such that the flow remains aligned or focused with closeable vents 150a-b. So if the occupant is in a normal position and inflation is unrestricted, gas deflector 130 functions as normal to redirect the inflation gas generally toward the vent(s). The large vent(s) are quickly closed as the cushion fully expands retaining gas for normal occupant restraint.

In the embodiment depicted in FIGS. 1A-1B, each closeable vent 150 is a cinch vent which is closed by tether 170 as rim 151 is drawn into the interior 102 of the inflatable airbag cushion 101. Cinch vent 150 may comprises a cinch tube 152 with a rim 151. A tether holder such as sleeve 153 with holes referred to as sleeve apertures 154 may be used to hold a vent portion 173 of tether 170. Vent aperture 158 is defined by the inner diameter or rim 151 of tube 152. As described below, cinch vent 150 is closed by tether 170 as rim 151 is drawn into the interior 102 of inflatable airbag cushion.

Cinch vent 150 may be embodied with a generally cylindrical shape. The cinch tube may be formed from a separate material that is sewn to the side of membrane 110 or it may be an integral extension. The cinch tube may have any suitable shape such as rectangular, triangular, or polygon shapes. The cinch tube may also have a taper such as a broad base which transitions to a relatively narrower rim. The cinch tube may be embodied with a height that is sufficient to achieve desired closure. In one embodiment, the cinch tube has height which is about half of its diameter. Selecting an appropriate height to diameter ratio permits the cinch tube to close during cinching without resistance from cushion membrane tension. The design permits the cinch tube to be a low-stress element in the cushion assembly which is helpful during unfolding of the cushion and pressurization. The cinch tube may comprise a nylon woven fabric-type or other suitable material known in the art.

An additional embodiment of a closeable vent is shown in FIGS. 5-6 at 150a' and 150b' which is referred to as a laced vent. Laced vents are also disclosed in U.S. patent application Ser. No. 11/528,118 titled AIRBAG CUSHION WITH A LACED VENT TO OPTIONALLY VENT GAS FOR OUT-OF-POSITION CONDITIONS which was filed on Sep. 27, 2006. Cinch vents and other closeable vents are also disclosed in U.S. patent application Ser. No. 11/296,031 titled AIRBAG CUSHION WITH GAS DEFLECTOR AND CINCH TUBE TO VENT GAS FOR OUT-OF-POSITION CONDITIONS which was filed on Dec. 7, 2005; U.S. patent application Ser. No. 11/295,953 titled LOCKING MECHANISM FOR A CINCH TUBE TO VENT GAS OF AN AIRBAG CUSHION which was filed on Dec. 7, 2005; U.S. patent application Ser. No. 10/959,256 titled AIRBAG CUSHION WITH VENT FOR REDUCED OUT-OF-POSITION EFFECTS which was filed on Oct. 6, 2004; U.S. patent application Ser. No. 10/959,387 titled AIRBAG CUSHION WITH TETHER DEACTIVATED VENTING FOR REDUCED OUT-OF-POSITION EFFECTS which was filed on Oct. 6, 2004; and U.S. patent application Ser. No. 10/832,843 titled CUSHION VENTING DESIGN FOR OUT OF POSITION OCCUPANT PROTECTION which was filed on Apr. 27, 2004. Other examples of closeable vents referred to as flap vents are also disclosed in U.S. patent application Ser. No. 11/528,266 titled AIRBAG CUSHION WITH A FLAP VENT TO OPTIONALLY VENT GAS FOR OUT-OF-POSITION CONDITIONS which was filed on Sep. 27, 2006. An additional example of a closeable vent is disclosed in Ser. No. 11/031,394 titled AIRBAG CUSHION WITH ADAPTIVE VENTING FOR REDUCED OUT-OF-POSITION EFFECTS which was filed on Jan. 7, 2005. These applications are hereby incorporated by reference.

As described above, airbag cushion 101 includes a control tether 170. Each tether has a vent portion 173 which is configured to actuate the closeable vent. Tether 170 is configured to move with the expansion of airbag cushion 101 to enable vent portion 173 to close closeable vent 150. One end of tether 170 is connected to vent 170 via stitching 171 and the other end is connected to cushion membrane 110 via a tether attachment 179 which is part of or extends from membrane 110 of airbag cushion 101. Tether attachment 179 serves as an anchor for an end of tether 170. In another embodiment, the tether attachment is stitching between cushion membrane 110 and tether 170. In another embodiment, tether 170 is an integral extension of either cushion membrane 110 or cinch tube 152. Alternatively, tether 170 is not fixedly anchored but is moveably anchored to cushion membrane 110 via tether attachment 179' as shown in FIG. 5 which is essentially a loop that permits movement of tether 170. Other components of another embodiment of a control tether are described with reference to FIGS. 7A-7B and FIGS. 8A-8B. The tether attachment may be disposed elsewhere such as proximate to a different portion of interior surface 111. Alternatively, the tether attachment may be a portion of exterior surface 112. For example, the tether attachment may be at the bottom of the face surface 113, which is the surface of the airbag cushion directed to the occupant. Thus, tether 170 may extend through the interior 102 of the airbag cushion 101 or may be positioned exterior to the airbag cushion 101. The location of the tether attachment 179 depends on module deployment angle, vehicle interior geometry, and cushion fold type. The tether 170 may comprise a nylon material or other suitable material known in the art.

Figure 2A:
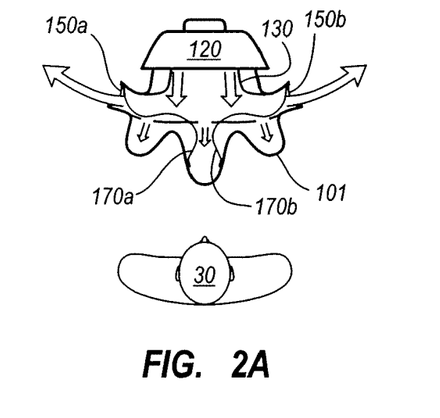
FIG. 2A is a cross-sectional view illustrating initial deployment of an airbag cushion for an occupant in a normal position.
Figure 2B:
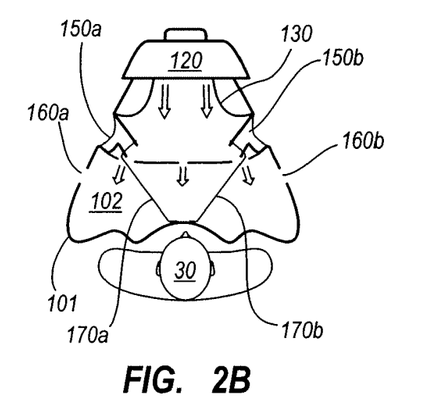
FIG. 2B is a cross-sectional view illustrating a deploying airbag cushion which is partially deployed as it encounters an occupant in a normal position.
Figure 2C:
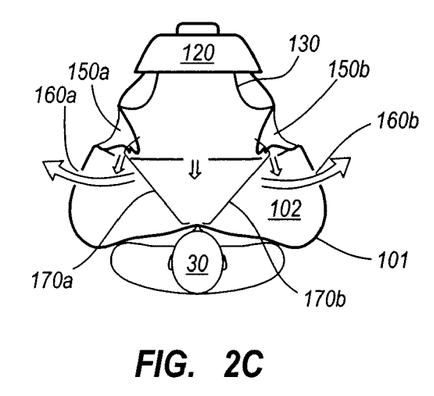
FIG. 2C is a cross-sectional view of an airbag cushion which has closed vents to enable the airbag cushion to fully deploy.

FIGS. 2A-C illustrate three stages of airbag cushion 101 deploying without encountering obstruction in the deploying path. The depicted airbag cushion 101 includes gas deflector 130, two closeable cinch vents 150a-b symmetrically disposed on cushion 101 and two optional fixed vents 160a-b symmetrically disposed on the cushion 101. Fixed vents 160a-b provide consistent venting of the airbag cushion 101 and are not restricted by an occupant's position. In addition to remaining open, fixed vents 160a-b also differ from closeable vents 170a-b as fixed vents 160a-b are typically smaller. Fixed vents 160a-b may be optional in certain cushion embodiments based on venting requirements. The locations for closeable vents 150a-b and fixed vents 160a-b may vary as does the number of vents. An occupant 30 is in a normal seating position which will allow the airbag cushion 101 to fully expand before impacting the occupant. In this manner, the occupant 30 benefits from the full restraint capability of the airbag cushion 101.

In FIG. 2A, the initial breakout of the airbag cushion 101 occurs. The closeable cinch vents 150a-b are open and, in the depicted embodiment, extend from the airbag cushion 101. Because cushion 101 is initially in a folded condition, at initial breakout (such as the initial 7 milliseconds), closeable cinch vents 150a-b are initially non-functional. Because an occupant is not positioned directly in front of the airbag cushion 101 in FIG. 2A, cushion 101 unfolds and is allowed to pressurize normally. In FIG. 2B, tethers 170a-b which respectively correspond with cinch vents 150a-b are pulled taut and gas flow through cinch vents 150a-b is restricted. In FIG. 2C, cinch vents 150a-b are completely closed, the gas vents through the fixed vents 160a-b, and normal restraint is provided to the occupant 30.

Figure 3A:
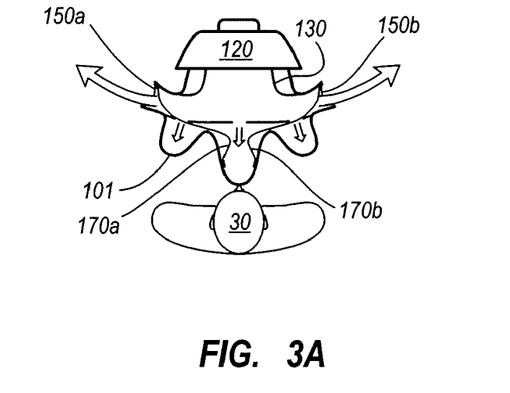
FIG. 3A is a cross-sectional view illustrating initial deployment of an airbag cushion for an out-of-position occupant.
Figure 3B:
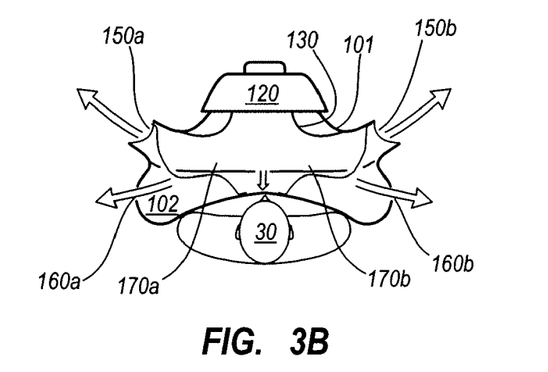
FIG. 3B is a cross-sectional view illustrating a deploying airbag cushion which is only partially deployed as it has encountered an out-of-position occupant.
Figure 3C:
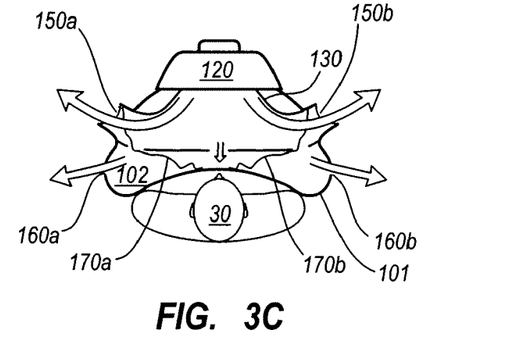
FIG. 3C is a cross-sectional view of an airbag cushion which remains only partially deployed as the closeable vents remain open to prevent full deployment of the airbag cushion.

FIGS. 3A-C illustrate three stages of a deploying airbag cushion 101 with obstruction in the deploying path. An occupant 30 is out-of-position and obstructs the deploying airbag cushion 101 and prevents the airbag cushion 101 from fully inflating. In FIG. 3A, airbag cushion 101 begins initial deployment as in FIG. 2A but encounters occupant 30 causing gas to be vented through fixed vents 160a-b. Fixed vents 160a-b may be located in the side panels of cushion 101 near closeable vents 150a-b, as shown. In FIG. 3B, airbag cushion 101 impacts the occupant 30 and the tethers 170a-b remain slack. The closeable vents 150a-b remain open and venting rapidly occurs from cinch vents 150a-b and fixed vents 160a-b. The cushion inflation is restricted and the occupant 30 receives less than the full deployment loading of the cushion 101. In FIG. 3C, cushion 101 is partially inflated and provides limited restraint. Venting continues through cinch vents 150a-b and fixed vents 160a-b.

Figure 4:
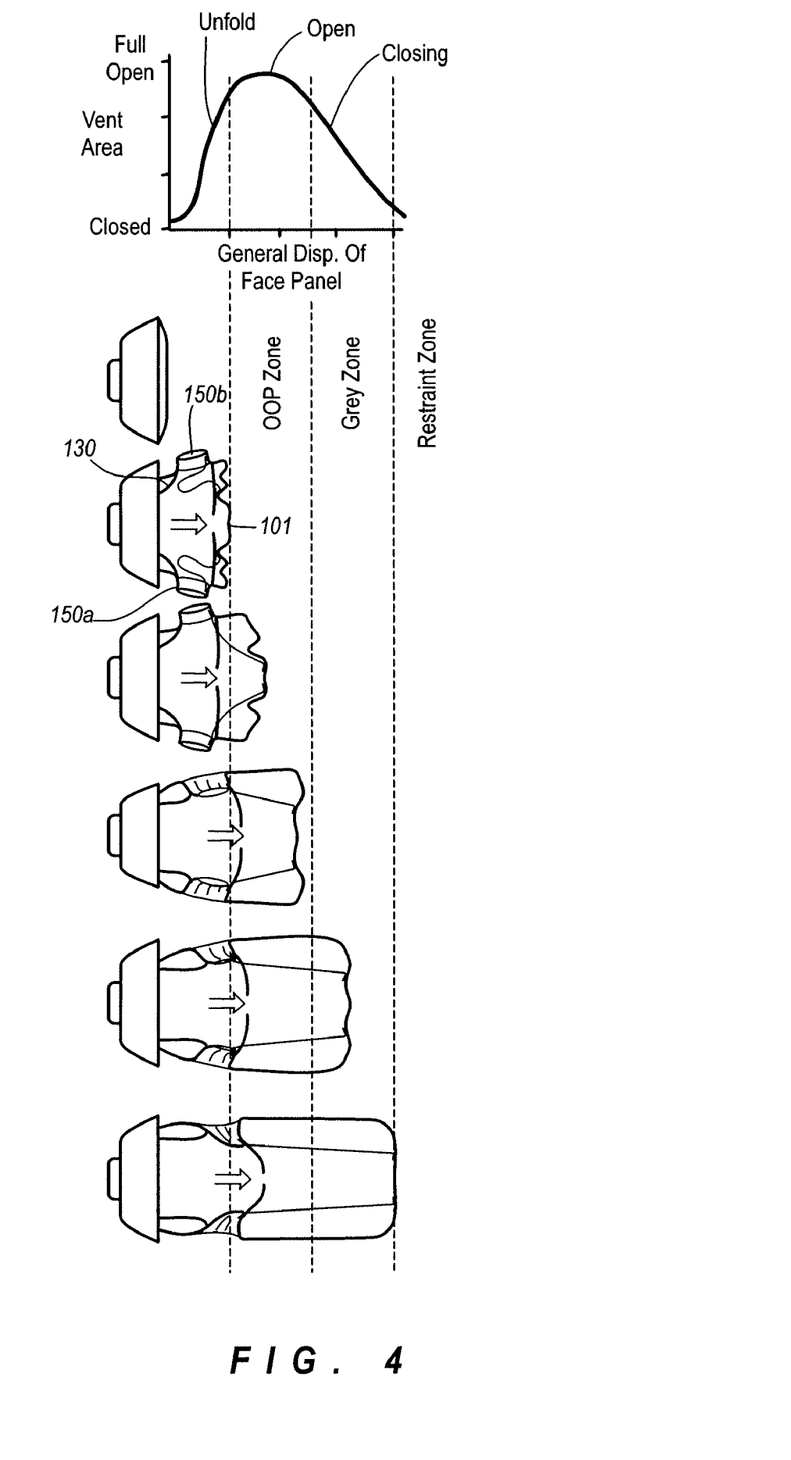
FIG. 4 is a diagram illustrating an airbag cushion venting graph in relation to an airbag cushion's deployment.

Referring to FIG. 4, a graph illustrating venting as a function of airbag cushion displacement is shown. For reference, an airbag cushion 101 is shown in various stages of deployment with gas deflector 130 and two symmetrically disposed cinch vents 150a-b. During initial deployment, airbag cushion 101 is unfolding and cinch vents 150a-b provide little or no venting. Airbag cushion 101 expands into an out-of-position zone where, if obstructed, the cinch vents 150a-b will remain completely or nearly open and full venting occurs. In this zone an occupant does not receive the full restraint capability but does benefit from limited restraint. If unobstructed, airbag cushion 101 expands into a gray zone where partial closure of the cinch vents 150a-b begins and venting is limited. If further unobstructed, airbag cushion 101 fully expands to the restraint zone. At this zone, cinch vents 150a-b completely close and an occupant benefits from the full restraint capability of airbag cushion 101.

Early in a normal inflation, gas loss through cinch vent 150a-b is minimal even with gas deflector 130. This phenomenon is due to the Bernoulli effect—pressure is lower in a moving fluid than in a stationary fluid. For example, if the convex side of a spoon is placed into a smooth stream of water from a faucet, the spoon is pulled into the stream. The higher pressure outside the moving fluid pushes the spoon into the lower pressure water. In an airbag deployment, the high velocity stream of gas flowing into the cushion creates a similar effect for approximately 30 milliseconds, particularly in the area of throat 108. Since pressure outside the cushion is still atmospheric, there is a pressure imbalance and gas flows into the cushion, not out of the cushion, when the vent is positioned alongside of the gas flow stream and not in its path.

FIGS. 5-6 depict another embodiment of an airbag cushion as designated by 101' which has been fully deployed. Airbag cushion 101' comprises another embodiment of a gas deflector as identified at 130', another embodiment of a pair of closeable vents as identified at 150a'-150b' and another embodiment of a tether as identified at 170'.

Like gas deflector 130, gas deflector 130' is configured to create a pressure pocket and re-direct the inflation gas after gas after the gas enters via a gas deflector opening 132 which corresponds with the throat opening 108. Also, arms 137a'-b' move with vents 150a'-b'. However, arms 137a'-b' are configured so that gas deflector 130' is Y-shaped instead of T-shaped like gas deflector 130.

Closeable laced vents 150a'-150b' comprise opposing vent sides 152a'-152b'. Opposing sides 152a'-152b' have holes 154a'-154b' which receive the vent portion 173a'-173b' of tether 170a'-170b' in a single laced configuration. Opposing sides 152a'-152b' come together respectively at ends 156a'-156b'. Sides 152a'-152b' are located around a vent aperture 158a'-158b' in the membrane 110 of the inflatable airbag cushion 101. Vent aperture 158a'-158b' is defined by edges 151a'-151b' of sides 152a'-152b'. The closeable laced vent may be reinforced as needed with a suitable material such as a nylon woven fabric-type or other material known in the art. For example, optional panel strips may also be used to reinforce sides 152a'-152b' or a sleeve may be formed to assist in reducing surface tension when under pressure.

Closeable laced vents 150a'-150b' may be formed by cutting a slit in membrane 110 or by removing a portion of membrane 110. Closeable laced vents may also be formed which are co-linear with a seam of the airbag, such as seam 116 by not seaming the opposing portions of material together. The vent aperture of the closeable vent may have any suitable shape. Vent portions 173a'-173b' may also have other configurations. For example, vent portions 173a'-173b' may extend diagonally across vent apertures 158a'-158b' in a double laced configuration like a shoelace without retention knots 171a'-171b'. Note that in such a double laced configuration, neither end of the control tether is necessarily attached to a closeable vent.

Symmetrical closeable vents 150a'-b' of airbag cushion 101', as shown in FIGS. 5-6, are linked by tether 170' which comprises integral halves 170a'-b'. So a single cord or piece of material such as tether 170' can be used instead of a tether corresponding to each closeable vent. Tether 170' passes through a tether attachment 179' which acts as a loop that is coupled to the interior surface 111 of airbag cushion 101. Tether attachment 179' may be formed of a fabric material similar or identical to that of the airbag cushion 101'. Tether 170' may freely pass through tether attachment 179' and may therefore be referred to as a "floating" tether which is moveably anchored while tethers 170 are fixedly anchored. In an alternative embodiment, the tether may be disposed on the airbag cushion exterior and pass through a tether attachment coupled to an exterior surface 112 of the airbag cushion 101'. Note that upon deployment, the distance from the location of tether attachment 179' to throat 108 is greater than the distance from throat 108 to either closeable vent 150a' or 150b'.

FIGS. 7A-7B and 8A-8B provide views of airbag module 200 after airbag cushion 201 has deployed. Airbag cushion 201 has a gas diffuser 230 which is identical to gas diffuser 130. Airbag cushion 201 also features other embodiments of vents as identified at 250a-b and tethers as identified at 270a-b.

Figure 7A:
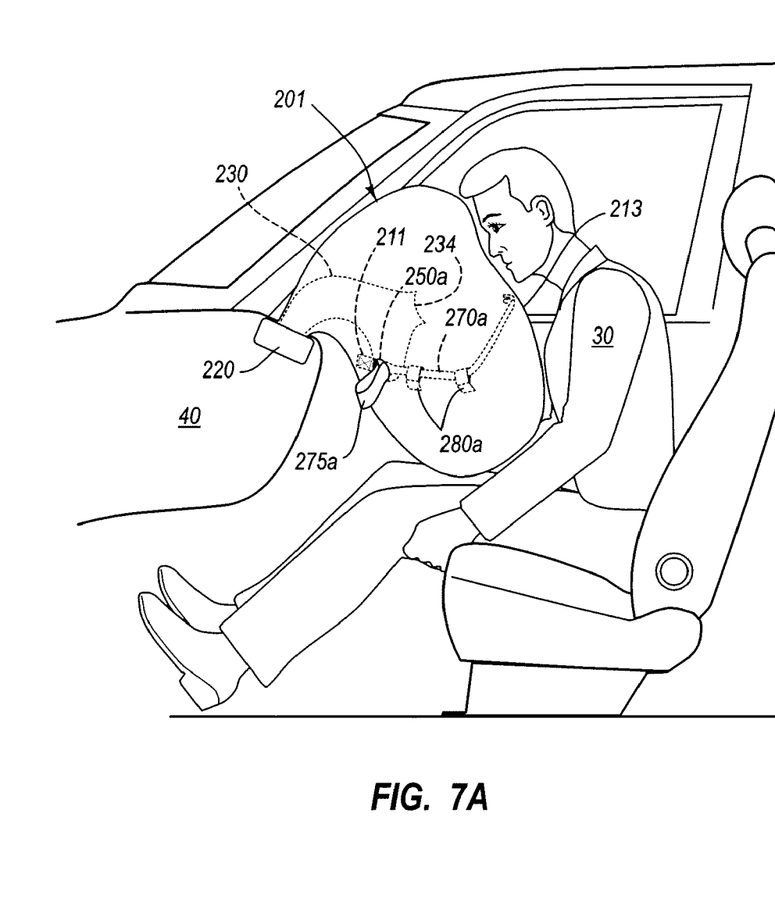
FIG. 7A is a perspective view of another embodiment of an airbag module. The airbag cushion is shown partially deployed with its vent open and with its tether and the gas deflector shown in phantom.
Figure 7B:
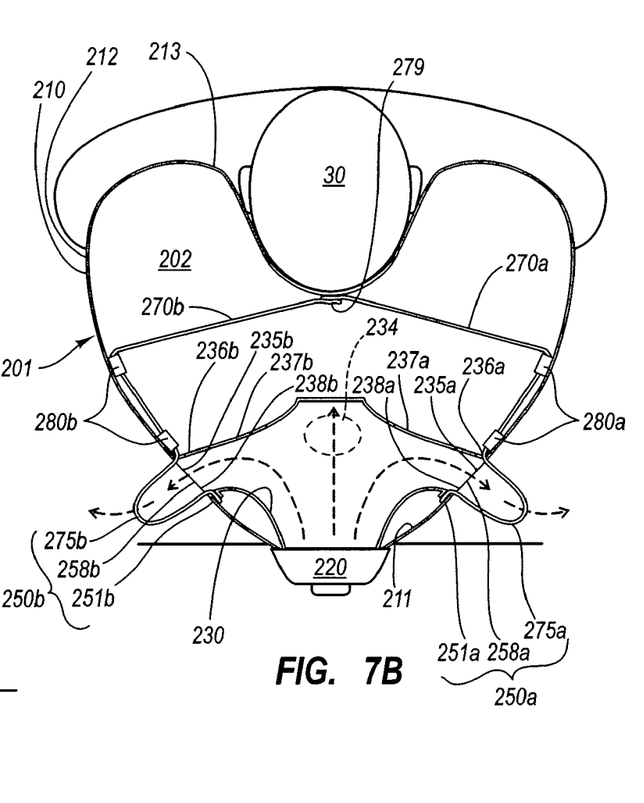
FIG. 7B is a cross-sectional view of the airbag cushion shown in FIG. 7A.
Figure 8A:
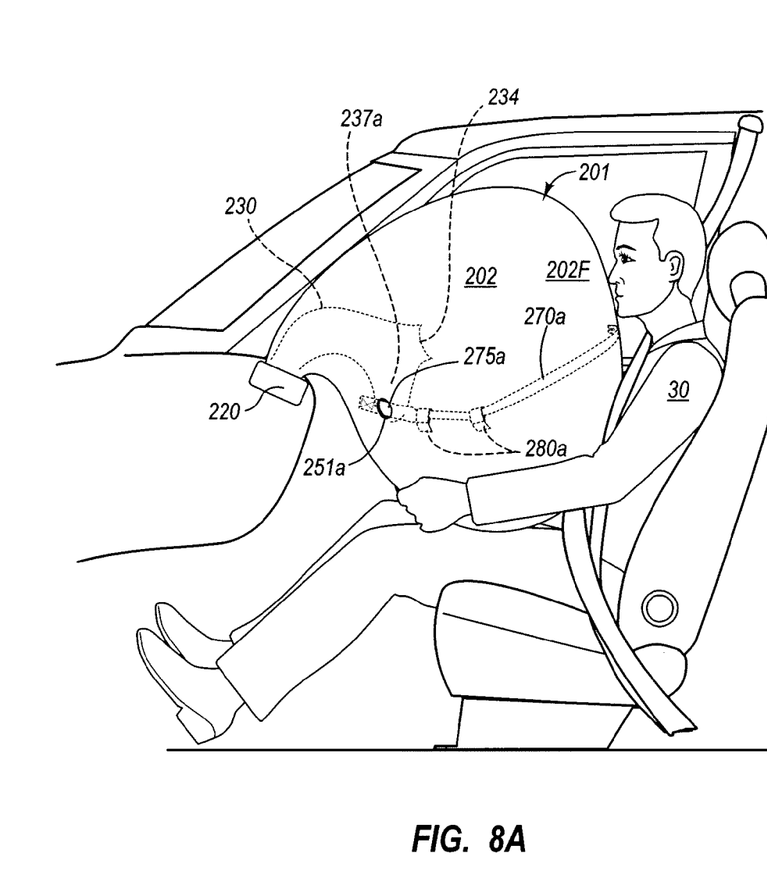
FIG. 8A depicts the same embodiment shown in FIGS. 7A-7B and provides a perspective view of the fully deployed airbag cushion which shows in phantom the gas deflector, the tether and the closed vent.
Figure 8B:
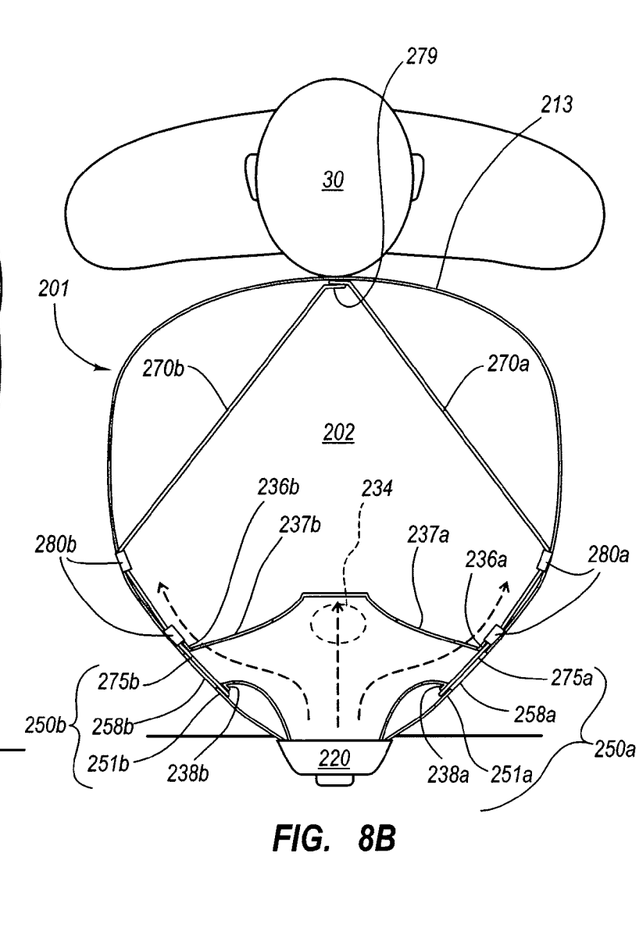
FIG. 8B is a cross-sectional view of the airbag cushion shown in FIG. 8A.

In FIGS. 7A-7B, airbag module 200 is shown during deployment with an out-of-position occupant 30 adjacent thereto as the out-of-position occupant's head has makes contact with airbag cushion 201. The presence of the out-of-position occupant thus prevents control tethers 270a-b from fully extending and thereby prevents vents 250a-b from closing so inflation gas is free to exit therefrom and prevent full inflation of the airbag cushion 201. In this manner, the pressure and inflation forces on the out-of-position occupant are lessened and the risk for injury from the airbag deployment is reduced accordingly. FIGS. 8A-8B show occupant 30 in a normal position and airbag cushion 201 fully deployed.

Gas diffuser 230 is T-shaped with arms 237a-b which respectively terminate at openings 235a-b. The gas is directed out of direct opening 234 and openings 235a-b. Each arm 237a-b terminates at opening 235a-b and each opening 235a-b is defined by rim 236a-b. At least a portion of each rim 236a-b is attached to cushion membrane 210 while the remainder of each rim 236a-b is unattached to cushion membrane 210 so that gas can be re-directed out of gas deflector 230 and into the interior 202 of inflatable airbag cushion 201 when the respective closeable vent 250a-b is closed. Like the attached portion of each rim 136a-b, each attached portion of rim 236a-b has a round configuration. Also, like the unattached portion of each rim 136a-b, each unattached portion of rim 236a-b has a parabolic configuration. In the depicted embodiments, the attached portion of the rim is positioned and sized relative to the unattached portion so that when the closeable vent is open a majority of gas is directed out of the interior of the airbag cushion. The depicted embodiments also show the unattached portion of the rim positioned so that gas is directed toward a front portion 102f or 202f of the interior when the closeable vent is closed.

Each vent 250 has a rim 251 which defines the vent aperture 258. Each vent 250 is closed by a vent flap 275. In the depicted embodiment, the vent flap is a continuous extension of a strap or tether as identified at 270. Vent flap 275 is coupled to an interior surface 211 of the cushion 201 and proximate to vent aperture 258.

Tether 270 couples at one end to vent flap 275 and at an opposing end to the interior surface 211 opposite to face surface 213. Tether 270 is coupled to the interior surface 211 at a location opposing the face surface 213 that contacts an occupant 30. One or more loops 280 are coupled to the interior surface 211 and retain tether 270 in position. Vent flap 275 and tether 270 may be integrally formed or may be coupled to one another by stitches, bonds, or adhesives. Vent flap 275 and tether 270 may include a nylon fabric material or any other material suitable in the art. Vent flap 275 and tether 270 may each be coupled to the interior surface 211 by stitches, bond, or adhesives. Of course, tethers 270 can alternatively be moveably anchored to the cushion membrane instead of being fixed as depicted. The tether may alternatively be configured to have tabs or teeth which pass through one or more loops, such as loops 280, without being able to pass back through the loops. Such a configuration permits the tether to incrementally cinch the vent closed in a deployment direction while restricting movement in the opposite direction such as during ride-down.

Before deployment of cushion 201, vent flap 275 partially extends out of vent aperture 258 and then enters back into the vent aperture 258. In so doing, vent flap 275 forms a U-shape outside of the vent aperture 258 and allows gas to exit through the vent 250.

During deployment, tether 270 is initially slack and vent flap 275 remains partially outside of the cushion interior 202. As the airbag cushion 201 deploys, the face surface 213 contacts the out-of-position occupant 30. Because of the limited deployment, the tether 270 is not able to fully extend and the vent flap 275 remains extending through the vent aperture 258. Gas freely vents through the vent aperture 258 and pushes against the vent flap 275 so that the vent aperture 258 is not obscured. The airbag cushion 201 builds up less pressure and avoids injuring an occupant 30 impeding the deployment.

Referring to FIGS. 8A-8B, views of a deployed airbag cushion 201 are shown without the occupant 30 obstructing deployment. When an occupant is in position, this configuration also permits closeable vent 250 to be closed by blocking the flow of gas out of the vent aperture 258 by vent flap 275. Airbag cushion 201 is able to fully deploy before contacting the occupant 30 thereby providing maximum restraint. As the airbag cushion 201 deploys, tether 270 is pulled until taut which forces the entire vent flap 275 into the cushion interior 202. The vent flap 275 is pressed against the rim 251 of vent 250 by the interior gas pressure. The vent flap 275 is sized to extend through the vent aperture 258, enter the cushion interior 202, and close against the rim 251 without exiting through vent aperture 258.

Vent flap 275 has a surface which is sufficient to press against and cover the vent aperture 258 without exiting through the vent aperture 258. Vent flap 275 may be configured to not completely cover the vent aperture 258 when some limited venting is required. The vent flap may also includes a converging segment that converges to the tether or strap 270. One of skill in the art will appreciate that the vent flap 275 may be configured in a variety of shapes, all of which are included within the scope of the invention.

FIGS. 9A-9B and 10A-10B depict another embodiment of an airbag cushion at 301. Airbag cushion 301 is shown deployed with an out-of-position occupant in FIGS. 9A-9B and a normally positioned occupant in 10A-10B like FIGS. 7A-7B and 8A-8B. Airbag cushion 301 has a gas diffuser 330 which is similar to gas diffusers 130 and 230. Airbag cushion 301 also features other embodiments of vents as identified at 350a-b and tethers as identified at 370a-b.

Gas diffuser 330 is T-shaped with arms 337a-b which respectively terminate at openings 335a-b. The gas is directed out of direct opening 334 and openings 335a-b. Each arm 337a-b terminates at an opening 335a-b defined by rim 336a-b. At least a portion of each rim 336a-b is attached to cushion membrane 310 while the remainder of each rim 336a-b is unattached to cushion membrane 310 so that gas can be re-directed out of gas deflector 330 and into the interior 302 of inflatable airbag cushion 301 when the respective closeable vent 350a-b is closed.

Each tether 370a-b has a vent flap 375a-b with a plurality of apertures 376a-b which are initially aligned with the plurality of vent apertures 358a-b. In the depicted embodiment, the vent flap is a continuous extension of a tether. Each vent flap 375a-b is coupled to an interior surface 311 of the cushion 301 and proximate to the rims 351a-b which define the plurality of vent apertures 358a-b. Vent flaps 375a-b may move under the unattached portion of the rim (not shown). In another embodiment, the vent flaps may move through an opening or slot in each respective arm near the openings at the end of each arm.

Tethers 370a-b couples at one end to the respective vent flaps 375a-b and at an opposing end to the interior surface 311 along the side of the airbag cushion. Of course, Tethers 370a-b can also be moveably or fixedly connected together, like the embodiments discussed above, to other surfaces such as the interior surface 311 opposite face surface 313. Of course, tethers 370a-b may be separately attached elsewhere in a moveable or fixed configuration. If tether 370a-b is coupled to the interior surface 311 opposite face surface 313 it may be advantageous for tether 370a-b to pass through a loop attached to the interior surface along the side of the airbag cushion.

Figure 9A:
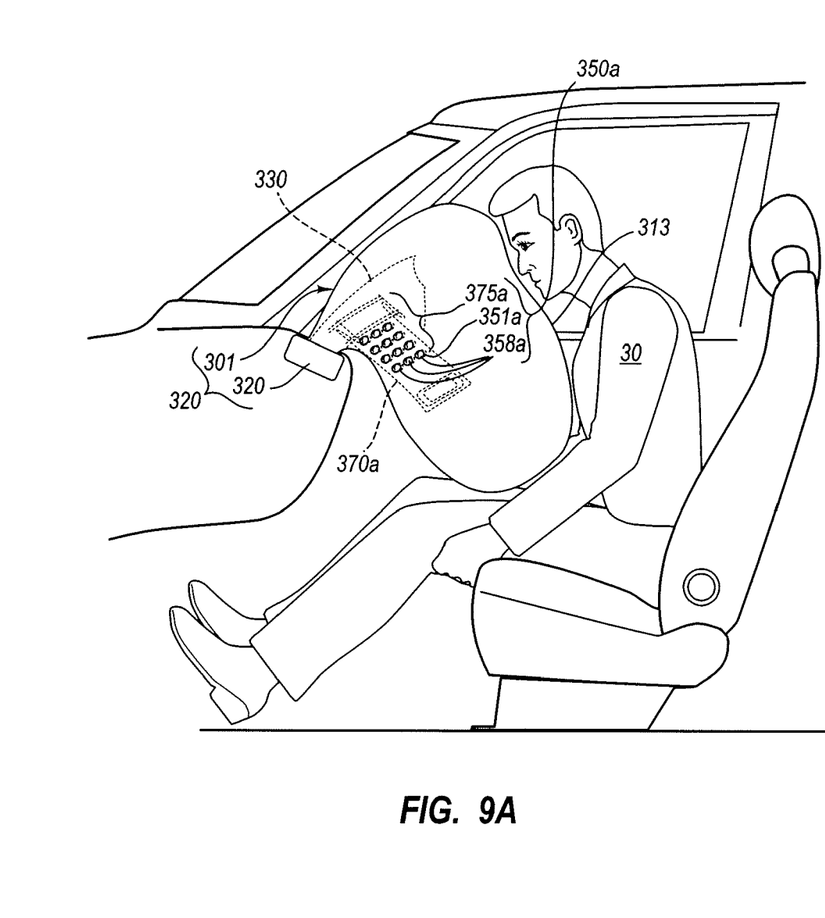
FIG. 9A is a perspective view of another embodiment of an airbag module. The airbag cushion is shown partially deployed with its vent open and with its tether and the gas deflector shown in phantom.
Figure 9B:
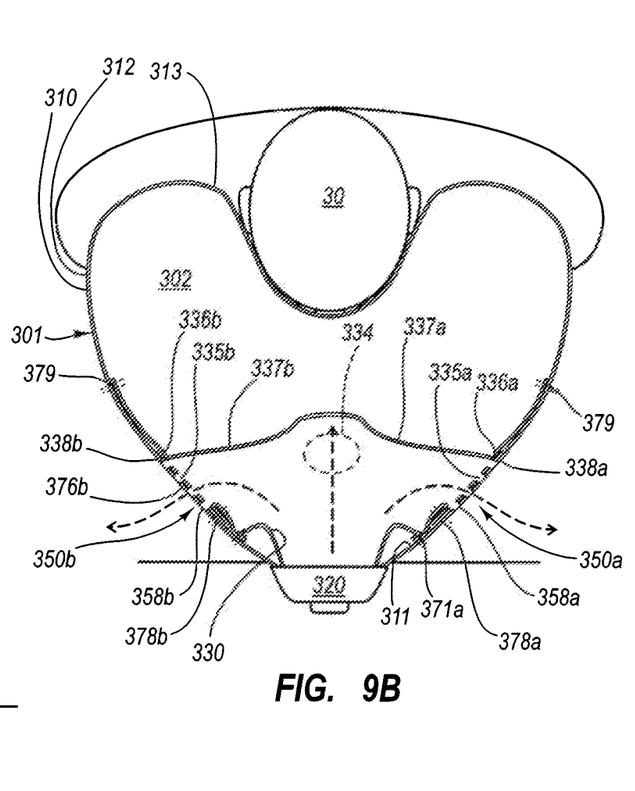
FIG. 9B is a cross-sectional view of the airbag cushion shown in FIG. 9A.

Tack stitches 378a-b of vent flaps 375a-b retain vent flaps 375a-b so that upon deployment with an out-of-position occupant as shown in FIGS. 9A-9B vent flaps 375a-b remain in place. Tack stitches 378a-b also prevent inadvertent closing of vents 350a-b during shipping and handling. Such tack stitching is designed to be easily broken.

Figure 10A:
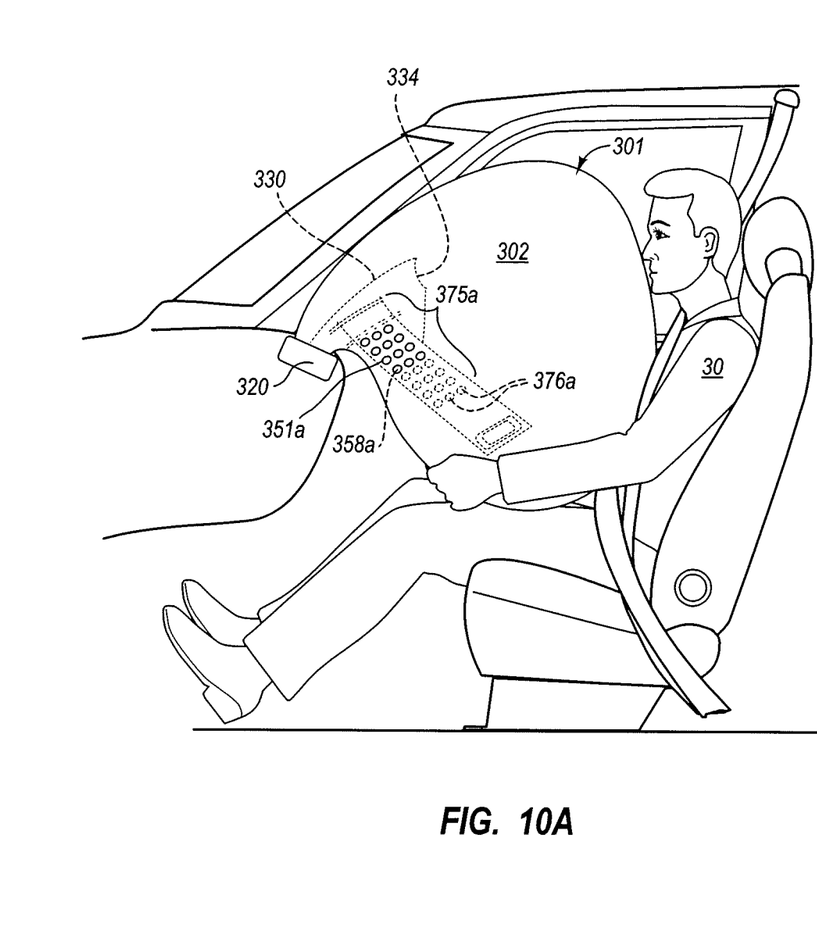
FIG. 10A depicts the same embodiment shown in FIGS. 9A-9B and provides a perspective view of the fully deployed airbag cushion which shows in phantom the gas deflector, the tether and the closed vent.
Figure 10B:
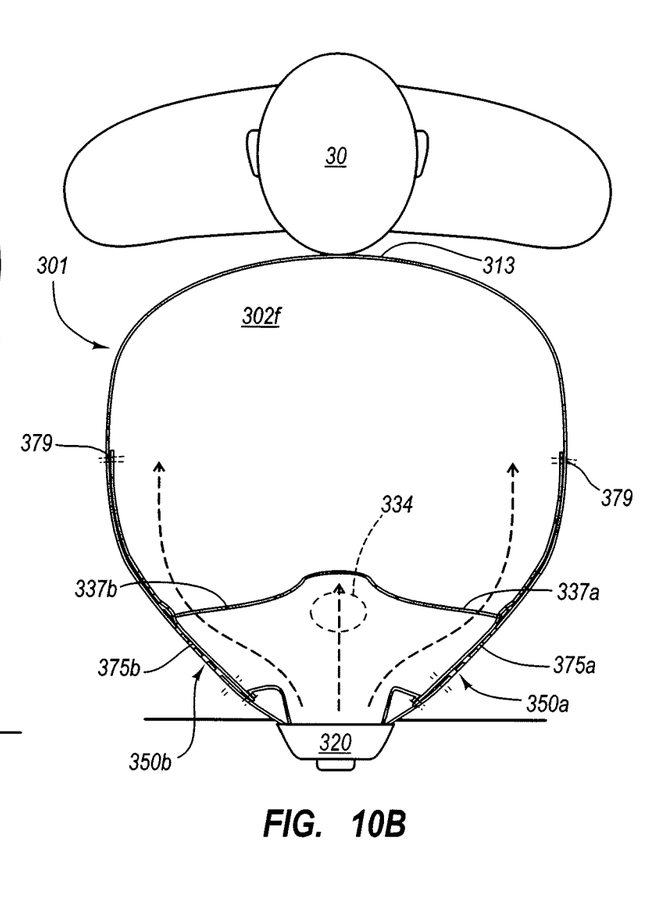
FIG. 10B is a cross-sectional view of the airbag cushion shown in FIG. 10A.

FIGS. 10A-10B show airbag cushion after deploying when an occupant is in a normal position. Tack stitches 378a-b have been ruptured due to the pressure of vent flaps 375a-b being pulled by the sides of airbag cushion 301. The plurality of apertures 376a-b of vent flap 375a-b have become misaligned with the plurality of vent apertures 358a-b so that the flow of gas out of vent apertures 358a-b is blocked and diverted toward the front portion 302f of interior 302.

Embodiments disclosed herein illustrate novel techniques for venting an airbag cushion to retain an open vent when an occupant obstructs the path of a deploying cushion and a closed vent when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

Many design variations are possible and should be considered within the scope of the invention. For example, the airbag cushion body may have a plurality of cushion vents formed therein and each of the cushion vents may have an associated arm of the gas diffuser. Accordingly, the design could be tailored to adjust or fine tune the deployment and deployment forces in accordance with various occupant positions. The design could be tailored, for instance, to allow a small number of cushion vents to remain open in the event that an occupant is only slightly out of position, allow a greater number of cushion vents to remain open in the event that an occupant is further out of position, and allow most or all cushion vents to remain open in the event that an occupant is positioned very close to the airbag at the time of deployment. The design could also be tailored to account for a passenger being out of position laterally with respect to the airbag by configuring the control tethers to allow primarily the cushion vents on one side of the airbag cushion body or the other to remain open in accordance with the position of the out-of-position occupant.

Embodiments disclosed herein illustrate novel techniques for venting an airbag cushion to retain an open vent when an occupant obstructs the path of a deploying cushion and to close and remain closed when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

Various embodiments for closeable vents have been disclosed herein. The closeable vents disclosed herein are examples of means for selectively venting gas out of the airbag.

A control cord or control tether, as disclosed herein, is an example of means for restricting gas venting by moving the selectively venting means upon inflatable airbag deployment without obstruction and enabling the vent aperture to remain open upon inflatable airbag deployment with obstruction. The control tether is also an example of means for restricting gas venting by closing the venting means upon inflatable airbag deployment without obstruction and enabling the venting means to remain open upon inflatable airbag deployment with obstruction.

The combination of a closeable vent and a control tether, as disclosed herein, is an example of means for restricting gas venting by closing the venting means to reduce the aperture of the venting means upon inflatable airbag deployment without obstruction and enabling the venting means to remain open upon inflatable airbag deployment with obstruction.

The gas deflectors disclosed herein are examples of means for diffusing gas within an airbag cushion by re-directing inflation gas received from an inflator. The gas deflectors disclosed herein are also examples of means for diffusing gas by re-directing inflation gas to the venting means from an inflator such that the gas rapidly exits the inflatable airbag cushion via the venting means when deployment of the airbag is obstructed.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112 ¶6.

The invention claimed is:

1. An airbag module, comprising:
   an inflatable airbag cushion comprising
      a cushion membrane that defines an interior of the inflatable airbag cushion,
      at least one closeable vent configured to optionally vent gas out of the interior of the inflatable airbag cushion via a vent aperture;
      a tether comprising a first end and a second end, wherein the first end is connected to the closeable vent and the second end is positioned such that the tether is slack and the closeable vent is open when deployment of the inflatable airbag cushion is initiated, such that the tether does not fully extend and the closeable vent remains open when obstruction is encountered after deployment of the inflatable airbag cushion, and such that the tether extends and at least partially closes the closeable vent upon deployment of the inflatable airbag cushion without obstruction; and
      a gas deflector positioned in the interior of the inflatable airbag cushion to direct inflation gas from an inflator, wherein the gas deflector has an arm configured to permit gas to be re-directed from an inflator to the closeable vent, wherein the arm of the gas deflector and the closeable vent are configured to move together during expansion of the inflatable airbag cushion while permitting the tether to separately move.

2. The airbag module of claim 1, wherein the gas deflector has at least one inflation opening positioned to rapidly direct gas out of the gas deflector to the interior of the inflatable airbag cushion.

3. The airbag module of claim 1, wherein the gas deflector is T-shaped.

4. The airbag module of claim 1, wherein movement together of the arm of the gas deflector and the closeable vent during expansion of the airbag enables gas exiting the arm to be continuously directed to the at least one closeable vent.

5. The airbag module of claim 1, wherein the arm terminates at an opening through which gas can be re-directed out of the gas deflector and into the interior of the inflatable air bag cushion when the closeable vent is closed.

6. The airbag module of claim 1, wherein the vent aperture is defined by a rim and wherein the closeable vent is closed by the tether as the rim of the vent aperture is drawn into the interior of the inflatable airbag cushion.

7. The airbag module of claim 1, wherein the tether is anchored to the cushion membrane via a tether attachment and wherein the tether is configured to optionally close the closeable vent.

8. The airbag module of claim 1, further comprising a fixed vent disposed on the airbag and adapted to vent gas during airbag deployment with and without obstruction.

9. An airbag module, comprising:
an inflatable airbag cushion comprising
a cushion membrane that defines an interior of the inflatable airbag cushion,
at least one closeable vent configured to optionally vent gas out of the interior of the inflatable airbag cushion via a vent aperture;
a tether comprising a first end and a second end, wherein the first end is connected to the closeable vent and the second end is positioned such that the tether is slack and the closeable vent is open when deployment of the inflatable airbag cushion is initiated, such that the tether does not fully extend and the closeable vent remains open when obstruction is encountered after deployment of the inflatable airbag cushion, and such that the tether extends and at least partially closes the closeable vent upon deployment of the inflatable airbag cushion without obstruction; and
a gas deflector positioned in the interior of the inflatable airbag cushion to direct inflation gas from an inflator,
wherein the gas deflector has an arm that terminates at an opening defined by a rim and at least a portion of the rim is attached to the cushion membrane at a location that permits gas to be re-directed from an inflator to the closeable vent and such that the arm of the gas deflector and the closeable vent move together during expansion of the inflatable airbag cushion, and
wherein at least a portion of the rim is unattached to the cushion membrane so that the tether moves through the opening and gas can be re-directed out of the gas deflector and into the interior of the inflatable airbag cushion when the closeable vent is closed.

10. The airbag module of claim 9, wherein the gas deflector has at least one inflation opening positioned to rapidly direct gas out of the gas deflector to the interior of the inflatable airbag cushion.

11. The airbag module of claim 9, wherein the attached portion of the rim has a round configuration.

12. The airbag module of claim 9, wherein the unattached portion of the rim has a parabolic configuration.

13. The airbag module of claim 9, wherein the attached portion of the rim is positioned and sized relative to the unattached portion so that when the closeable vent is open a majority of gas is directed out of the interior of the airbag cushion.

14. The airbag module of claim 9, wherein the unattached portion of the rim is positioned so that gas is directed toward a front portion of the interior when the closeable vent is closed.

15. The airbag module of claim 9, wherein the tether is anchored to the cushion membrane via a tether attachment and wherein the tether is configured to optionally close the closeable vent.

16. The airbag module of claim 9, wherein the vent aperture is defined by a rim and wherein the closeable vent is closed by the tether as the rim of the vent aperture is drawn into the interior of the inflatable airbag cushion.

17. The airbag module of claim 9, wherein the closeable vent is closed by blocking the flow of gas out of the vent aperture by a vent flap.

18. An airbag module, comprising:
an inflatable airbag cushion comprising
a cushion membrane that defines an interior of the inflatable airbag cushion,
at least one closeable vent configured to optionally vent gas out of the interior of the inflatable airbag cushion via a vent aperture;
a tether comprising a first end and a second end, wherein the first end is connected to the closeable vent and the second end is anchored to the cushion membrane such that the tether is slack and the closeable vent is open when deployment of the inflatable airbag cushion is initiated, such that the tether does not fully extend and the closeable vent remains open when obstruction is encountered after deployment of the inflatable airbag cushion, and such that the tether extends and at least partially closes the closeable vent upon deployment of the inflatable airbag cushion without obstruction; and
a gas deflector positioned in the interior of the inflatable airbag cushion to direct inflation gas from an inflator,
wherein the gas deflector has an arm that permits gas to be re-directed from an inflator to the closeable vent,
wherein the arm of the gas deflector and the closeable vent are configured to move together during expansion of the inflatable airbag cushion,
wherein the arm has an opening that permits gas to be re-directed into the interior of the inflatable airbag cushion when the closeable vent is closed and permits the tether to moveably extend from the closeable vent to the cushion membrane.

19. The airbag module of claim 18, wherein the gas deflector has at least one inflation opening positioned to rapidly direct gas out of the gas deflector to the interior of the inflatable airbag cushion.

20. The airbag module of claim 18, wherein movement together of the arm of the gas deflector and the closeable vent during expansion of the airbag enables gas exiting the arm to be continuously directed to the at least one closeable vent.

21. The airbag module of claim 18, wherein the opening is defined by a rim and at least a portion of the rim is attached to the cushion membrane, and wherein at least a portion of the rim is unattached to the cushion membrane.

22. The airbag module of claim 21, wherein the attached portion of the rim has a round configuration.

23. The airbag module of claim 21, wherein the unattached portion of the rim has a parabolic configuration.

24. The airbag module of claim 21, wherein the attached portion of the rim is positioned and sized relative to the unattached portion so that when the closeable vent is open a majority of gas is directed out of the interior of the airbag cushion.

25. The airbag module of claim 21, wherein the unattached portion of the rim is positioned so that gas is directed toward a front portion of the interior when the closeable vent is closed.

26. The airbag module of claim 18, wherein the tether is anchored to the cushion membrane via a tether attachment.

27. The airbag module of claim 18, wherein the tether is fixedly anchored to the cushion membrane.

28. The airbag module of claim 18, wherein the tether is moveably anchored to the cushion membrane.

29. The airbag module of claim 18, wherein the vent aperture is defined by a rim and wherein the closeable vent is closed by the tether as the rim is drawn into the interior of the inflatable airbag cushion.

30. The airbag module of claim 18, wherein the tether at least partially closes the vent by bringing a rim of the vent aperture together.

31. The airbag module of claim 18, wherein the closeable vent is closed by pulling a vent flap in through the vent aperture.

32. The airbag module of claim 18, wherein the closeable vent is closed by blocking the flow of gas out of the vent aperture by a vent flap.

* * * * *